Figure 1:
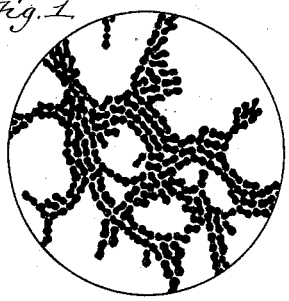

(No Model.)

V. STORCH.
FERMENT FOR RIPENING MILK, &c.

No. 561,291. Patented June 2, 1896.

Witnesses:
Theo. L. Popp.
Emil Neuhart

Vilhelm Storch, Inventor.
By Wilhelm & Bonner,
Attorneys.

UNITED STATES PATENT OFFICE.

VILHELM STORCH, OF COPENHAGEN, DENMARK, ASSIGNOR TO CHRISTIAN D. A. HANSEN, OF SAME PLACE.

FERMENT FOR RIPENING MILK, &c.

SPECIFICATION forming part of Letters Patent No. 561,291, dated June 2, 1896.

Application filed August 9, 1890. Serial No. 361,540. (No specimens.)

*To all whom it may concern:*

Be it known that I, VILHELM STORCH, a subject of the King of Denmark, residing at Copenhagen, Denmark, have invented new and useful Improvements in Ferment for Ripening Milk and its Derivatives, of which the following is a specification.

Heretofore it has been supposed that the source of the characteristic pure aromatic flavor peculiar to fresh butter of specially fine quality results principally from the feed consumed by the milch-cows and that the great difference in quality between winter butter and summer butter is due to the difference between the winter feed and the fresh-grass feed of the summer. I have found that this view is erroneous and that the taste and flavor of butter are not so much due to the quality of the feed as to products formed in the cream or milk by the action of various micro-organisms during the process of ripening. This is particularly true of the mild acid taste of fresh sour-cream butter, which, as I have found, is produced by certain micro-organisms, which as a rule also possess the ability to acidulate and coagulate or curdle milk and cream.

The object of this invention is to turn this discovery to practical account by cultivating the peculiar micro-organisms by which the pure rich flavor of butter is produced and placing these cultures in the hands of dairymen in such shape that they can be conveniently used for ripening cream and milk, thereby insuring a certainty and uniformity of result which it is impossible to attain at present.

Among the exceedingly large number of different micro-organisms or bacteria able to acidulate and curdle cream and milk which exist widely spread in the universe, and consequently may be active in the ripening of the milk and cream in the dairies, a very large number impart to the milk and cream a more or less impure (often strongly sour and disagreeable) taste, which is transferred to the butter, and a more or less impure odor, but no butter flavor. The bacteria which are active in the ripening of cream and milk vary in different creameries, for which reason the butter from different creameries differs in taste and flavor. It is also a well-known fact that comparatively few creameries are able to produce butter of especially rich flavor, although the greatest care is used. It is therefore of the greatest importance to the manufacturer of butter to obtain cultures of excellent acid bacteria for use in the ripening of the milk and cream. The materials from which these flavor-producing acid bacteria are obtained are fresh butter of excellent quality and of pure rich flavor, fully-ripened cream of the same quality and flavor, and fresh buttermilk from the churning of such cream. The isolation of said bacteria from the multitude of other micro-organisms existing in these materials is often very difficult and requires considerable experience. For this isolation I use the process usually employed by bacteriologists, which consists in spreading the bacteria germs from said materials in beef-peptone gelatin of neutral reaction with or without an addition of agar-agar. The pure cultivation of the separated flavor-producing acid bacteria can be effected either in absolutely sterilized cream, milk, or whey with or without an addition of carbonate of lime or of carbonates of the alkalies or in solutions of milk sugar, glucose, or sugar with the addition of various nitrogenous and other nutritive matters necessary to the development of the said bacteria—such as peptones, salts of ammonia, biphosphate of potassium, chlorid of calcium, sulfate of magnesium, &c.—or in neutral solutions free of sugar, as decoctions of fresh beef, vegetables, &c.

Figure 5:
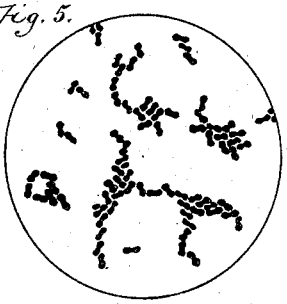
Figure 2:
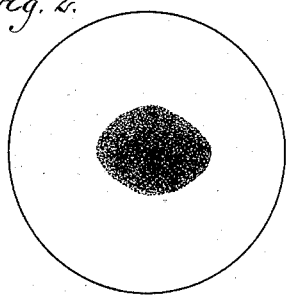
Figure 6:
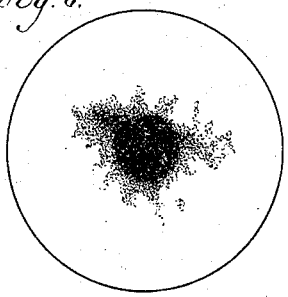
Figure 3:
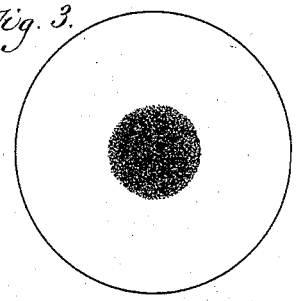
Figure 7:
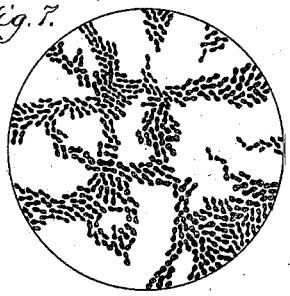
Figure 4:
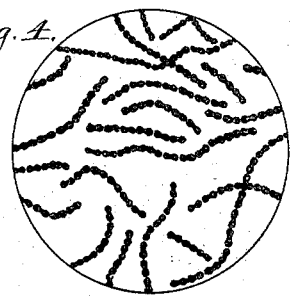
Figure 8:
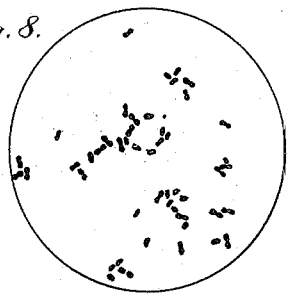

In the accompanying drawings, Figure 1 shows an enlarged view of one kind of flavor-producing bacteria. Fig. 2 is an enlarged edge view of a colony of these bacteria. Fig. 3 is an enlarged top view thereof. Fig. 4 is an enlarged view of another kind of flavor-producing bacteria. Fig. 5 is a similar view of another kind of flavor-producing bacteria. Fig. 6 is an enlarged view of a colony of the bacteria shown in Fig. 5. Figs. 7 and 8 are enlarged views of harmful bacteria.

Among the flavor-producing acid bacteria which I have so far discovered and isolated, and which are suitable for ripening milk and cream, are the following:

Ferment A, (*Bacterium acidi lactici aromagenes A:*) This bacterium forms, by distribution of the germs in gelatin, small colonies of lenticular form, which have a smooth surface and are opaque and of pure white color. The single bacterium is shaped like a rather elongated oval cell, which by division multiplies into shorter oval cells, which, previous to further subdivision, grow somewhat in length. Cultivated in cream, milk, or whey they are most frequently separated from each other or at most united two together, and form but rarely short chains of connected cells. Planted as puncture cultivation in neutral beef-peptone gelatin and agar-agar gelatin it forms no surface growth and develops along the cut often in colonies which may be separated or connected. In cream, milk, or whey it multiplies very quickly, curdling the milk into a rather firm and perfectly uniform curd. It acidulates cream and milk quickly and imparts to them a very pure, agreeable, mildly acid taste, as well as a very pure and rather rich flavor. This bacterium is of very small size, at the highest 0.0012 millimeter long by 0.0004 millimeter thick. This bacterium is shown at a linear enlargement of about eleven hundred and eighty-six times in Fig. 1 of the accompanying drawings, which figure represents a microphotograph of a small portion of a cover-glass preparation of the pure culture of the bacterium in beef-peptone gelatin, stained with gentiana violet. The colonies which are developed in beef-peptone gelatin have the form of a thick lens. Fig. 2 represents an edge view of such a colony, and Fig. 3 a top view, both drawn at a linear enlargement of fifty-five times. The closer one colony lies to another in the gelatin the smaller they are.

Ferment B, (*Strepto bacterium acidi lactici aromagenes B:*) This bacterium forms, by distribution of the germs in gelatin, small opaque colonies, usually of somewhat irregular shape, approximately lenticular, and of rather smooth surface and of white color. Planted as puncture cultivation in neutral beef-peptone gelatin and agar-agar gelatin it forms no surface growth and gives a very sparse and slowly-developing growth along the cut, with very weak fluorescence. In cream, milk, and whey it always grows in chains of connected cells, which latter are often in a more or less developed state of subdivision. The fully-developed cell has a regular oval shape and is larger than bacterium A, described above—namely, as a rule, 0.001 to 0.0013 millimeter long by 0.0006 millimeter thick. In cream, milk, or whey it multiplies rather slowly and best at a temperature above 20° centigrade. It ripens milk and cream and curdles them into a rather soft but uniform even curd, imparting to them a very agreeable extraordinarily mild acid taste and producing an exceedingly rich flavor. This bacterium is represented in Fig. 4 at a linear enlargement of about eleven hundred and eighty-six times.

Ferment C, (*Bacterium acidi lactici aromagenes C:*) This bacterium forms, by distribution in gelatin, very small white colonies of rather irregular yet mostly globular construction with not quite smooth surface, which in the polarized light shows strong refractive properties. The cultures develop sparsely and slowly in beef-peptone gelatin and agar-agar gelatin and show as puncture cultivation no characteristic peculiarity. In cream and milk, however, it multiplies quickly, ripening and curdling the same and imparting to them a pure rich acid taste and an agreeable and rather rich flavor. The size of the cell does not differ much from that of bacterium A, described above; but it is shorter and more chubby than said bacterium. Not unfrequently it forms short chains, yet it appears as often as single cells. This bacterium is represented in Fig. 5 at a linear enlargement of about eleven hundred and eighty-six times. The colonies of this bacterium have while young an almost smooth surface; but in a few days the surface becomes broken by projecting chains or tufts of bacteria, and the colonies assume an appearance like that represented in Fig. 6.

I wish now to call attention to some bacteria which may become very troublesome in the manufacture of butter and which must be excluded from the pure flavor-producing cultures.

Acid bacterium D, (*Bacterium lactis fluorescens Storch:*) This bacterium is so closely in form and size like *Bacterium acidi lactici aromagenes A*, above described, that it cannot be distinguished from the same by these characteristics. The colonies developed by distribution of the germs in beef-peptone gelatin differ, however, very essentially. While, as above described, ferment A forms lens-shaped white opaque colonies, the acid bacterium D forms disk-shaped colonies, which in passing light are transparent, like water, or slightly opalescent, but in reflected light are fluorescent, with a bright blue color. This bacterium D multiplies rapidly in milk and acidulates and curdles the same into a firm coagulum, like that produced by ferment A. It persistently accompanies other bacteria, and it is difficult to purify ferment A from this bacterium. If it develops in milk with ferment A, the action of the latter is checked and no flavor is produced. Fig. 7 represents this ferment D at a linear enlargement of about eleven hundred and eighty-six times.

Acid bacterium E: This bacterium imparts to butter a disgusting tallowy taste when it has attained full development during the ripening of the cream from which the butter is churned. It is represented in Fig. 8 at a linear enlargement of about eleven hundred and eighty-six times. Gelatin cultures of this bacterium are easily recognized by the fact that its colonies quickly spread into extended jelly-like and large opalescent spots on the surface of the gelatin.

The purity of the cultures of bacterium A, B, and C is readily ascertained by testing their effect in ripening small batches of pasteurized or sterilized milk or cream. These flavor-producing acid bacteria planted in a suitable substratum—for instance, beef-peptone gelatin—form a ferment which, when added to milk or cream, produces a uniform acidulation and curdling of the same and develops a pure rich flavor.

For the transportation and sale of these cultures, which may be either liquid or dry, hermetically-sealed vessels are employed in order to prevent the introduction of foreign bacteria.

In order to obtain the full benefit of these pure cultures in the manufacture of butter, the milk or cream should be pasteurized or partially sterilized. The pasteurization of the milk should be effected immediately upon its arrival at the creamery by heating it to 70° or 80° centigrade under constant agitation—for instance, by stirring or running it over a corrugated sheet of tinned iron or copper, under which hot water is applied. When the milk has reached this temperature, it is skimmed in a centrifugal creamer and the cream is cooled as quickly as possible to 15° or 20° centigrade or lower, when the cream is ready for ripening. If the milk has not been pasteurized before being skimmed, the cream should be pasteurized immediately after skimming. For that purpose the cream is placed in a water-bath, heated to 80° centigrade, and stirred until it has reached a temperature of 70° centigrade or a little less, or it may be run in a thin sheet over tinned iron or copper, under which hot water is applied. When it has reached this temperature, it is cooled as quickly as possible to the temperature suitable for ripening.

The ripening of the cream or milk by means of the said ferment, consisting of pure cultures of flavor-producing acid bacteria, is effected either by mixing the pure ferment directly with the entire mass of cream to be ripened or by mixing it with a sufficient quantity of sweet new milk or skim-milk, which has been either pasteurized or completely sterilized, and which when completely curdled and sour is added to the cream or milk to be ripened.

The ripened cream or milk is churned into butter or otherwise treated in any suitable or well-known manner.

I do not wish to claim in this application the herein-described method of making butter, because that is claimed in another application filed by me August 17, 1892, Serial No. 443,290.

I claim—

A ferment for ripening milk or its derivatives, consisting of practically pure cultures of flavor-producing acid bacteria, substantially as set forth.

Witness my hand this 15th day of July, 1890.

VILHELM STORCH.

Witnesses:
S. MIDDELBOE,
HENRY B. RYDER.